US012743239B2

(12) United States Patent
Wu

(10) Patent No.: US 12,743,239 B2
(45) Date of Patent: Sep. 22, 2026

(54) METHOD AND NON-TRANSITORY COMPUTER-READABLE STORAGE MEDIUM AND APPARATUS FOR HANDLING GARBAGE COLLECTION PROCESS

(71) Applicant: Silicon Motion, Inc., Zhubei City (TW)

(72) Inventor: Po-Wei Wu, New Taipei City (TW)

(73) Assignee: SILICON MOTION, INC., Zhubei City (TW)

( * ) Notice: Subject to any disclaimer, the term of this patent is extended or adjusted under 35 U.S.C. 154(b) by 0 days.

(21) Appl. No.: 19/097,135

(22) Filed: Apr. 1, 2025

(65) Prior Publication Data

US 2026/0244364 A1 Aug. 20, 2026

(30) Foreign Application Priority Data

Feb. 14, 2025 (CN) ........................ 202510162781.2

(51) Int. Cl.
*G06F 3/06* (2006.01)

(52) U.S. Cl.
CPC .......... *G06F 3/0659* (2013.01); *G06F 3/0611* (2013.01); *G06F 3/0679* (2013.01)

(58) Field of Classification Search
CPC ..... G06F 3/0611; G06F 3/0659; G06F 3/0679
USPC ........................................................ 711/154
See application file for complete search history.

(56) References Cited

U.S. PATENT DOCUMENTS 8,694,719 B2 * 4/2014 Lassa ..................... G06F 1/206 711/E12.008
10,452,122 B2 10/2019 Shih et al.
10,628,081 B2 * 4/2020 Wells .................... G06F 3/0611
11,762,766 B1 * 9/2023 Kuzmin ............. G06F 11/1068 345/600
11,809,713 B1 * 11/2023 Yang ................... G06F 12/0253
12,056,377 B2 * 8/2024 Yoo ....................... G06F 3/0658
2015/0029864 A1 * 1/2015 Raileanu ................ H04L 43/16 370/237

(Continued)

FOREIGN PATENT DOCUMENTS

CN 113438354 A 9/2021
TW 202244737 A 11/2022

(Continued)

OTHER PUBLICATIONS

Machine translation of TW 202441365 (Year: 2024).*
Machine translation of WO 2022234740 (Year: 2022).*

*Primary Examiner* — Reginald G Bragdon
*Assistant Examiner* — Aaron D Ho
(74) *Attorney, Agent, or Firm* — Birch, Stewart, Kolasch & Birch, LLP

(57) ABSTRACT

The invention introduces a method for handling a garbage collection (GC) process, performed by a processing unit of a flash controller, to include: detecting that a portable storage device is inserted into a host equipment; obtaining a maximum transmission bandwidth of a host interface (I/F); determining that a transmission bandwidth of a flash I/F is higher than the maximum transmission bandwidth of the host I/F; and in response to a determination that the transmission bandwidth of the flash I/F is higher than the maximum transmission bandwidth of the host I/F, inserting operations of the GC process during an execution of a host command.

20 Claims, 7 Drawing Sheets

(56) References Cited

U.S. PATENT DOCUMENTS

2016/0162215 A1* 6/2016 Jayaraman ............ G06F 3/0611
711/103
2017/0075590 A1* 3/2017 Espeseth ............... G06F 3/0613
2017/0277444 A1* 9/2017 Canepa ................... G06F 3/065
2018/0157309 A1* 6/2018 Shih .................... G06F 13/1673
2018/0293174 A1* 10/2018 Song ................... G06F 12/1009
2018/0357011 A1 12/2018 Wu et al.
2019/0018768 A1* 1/2019 Kim .................... G06F 12/0868
2019/0227927 A1* 7/2019 Miao ..................... G06F 3/0613
2020/0081658 A1* 3/2020 Choi ....................... G06F 3/064
2020/0089537 A1* 3/2020 Bahirat ................... G06F 9/468
2020/0226080 A1* 7/2020 Tarango .................... G06F 1/28
2022/0365707 A1 11/2022 Kachare et al.
2024/0427501 A1* 12/2024 Jain ......................... G06F 3/064

FOREIGN PATENT DOCUMENTS

TW 202441365 A * 10/2024 ........... G06F 3/0631
WO WO-2009003038 A2 * 12/2008 ......... G06F 12/0246
WO WO-2012148828 A2 * 11/2012 ........... G06F 3/0631
WO WO-2022234740 A1 * 11/2022 ............... G06F 3/06
WO WO-2023005748 A1 * 2/2023 ........... G06F 13/128

* cited by examiner

METHOD AND NON-TRANSITORY COMPUTER-READABLE STORAGE MEDIUM AND APPARATUS FOR HANDLING GARBAGE COLLECTION PROCESS

CROSS-REFERENCE TO RELATED APPLICATIONS

This application claims the benefit of priority to Patent Application No. 202510162781.2, filed in China on Feb. 14, 2025; the entirety of which is incorporated herein by reference for all purposes.

BACKGROUND

The disclosure generally relates to storage devices and, more particularly, to a method, a non-transitory computer-readable storage medium and an apparatus for handling a garbage collection process.

Flash memory devices typically include NOR flash devices and NAND flash devices. NOR flash devices are random access—a host side accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host side has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. How to improve the access performance of NAND flash memory has always been an important issue for NAND controllers.

SUMMARY

In an aspect of the invention, an embodiment introduces a method for handling a garbage collection (GC) process, performed by a processing unit of a flash controller. A portable storage device is equipped with the flash controller and a flash module. The method includes: detecting that the portable storage device is inserted into a host equipment; obtaining a maximum transmission bandwidth of a host interface (I/F); determining that a transmission bandwidth of a flash I/F is higher than the maximum transmission bandwidth of the host I/F; and in response to a determination that the transmission bandwidth of the flash I/F is higher than the maximum transmission bandwidth of the host I/F, inserting operations of the GC process during an execution of a host command.

In another aspect of the invention, an embodiment introduces a non-transitory computer-readable storage medium having stored therein program code that, when loaded and executed by a processing unit, causes the processing unit to perform the method for handling a GC process as described above.

In still another aspect of the invention, an embodiment introduces an apparatus for handling a GC process, to include: a host interface I/F, coupled to a host equipment; a flash I/F, coupled to a flash module; and a processing unit, coupled to the host I/F and the flash I/F. The processing unit is arranged operably to: detect that the portable storage device is inserted into the host equipment through the host I/F; obtain a maximum transmission bandwidth of the host interface; determine that a transmission bandwidth of the flash I/F is higher than the maximum transmission bandwidth of the host I/F; and in response to a determination that the transmission bandwidth of the flash I/F is higher than the maximum transmission bandwidth of the host I/F, insert operations of the GC process during an execution of a host command.

The GC process collects valid user data from a plurality of source blocks in the flash module through the flash I/F, and programs the valid user data into a destination block in the flash module through the flash I/F.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that changes may be made in the function and arrangement of elements without departing from the spirit and scope of the application as set forth in the claims.

Figure 1:
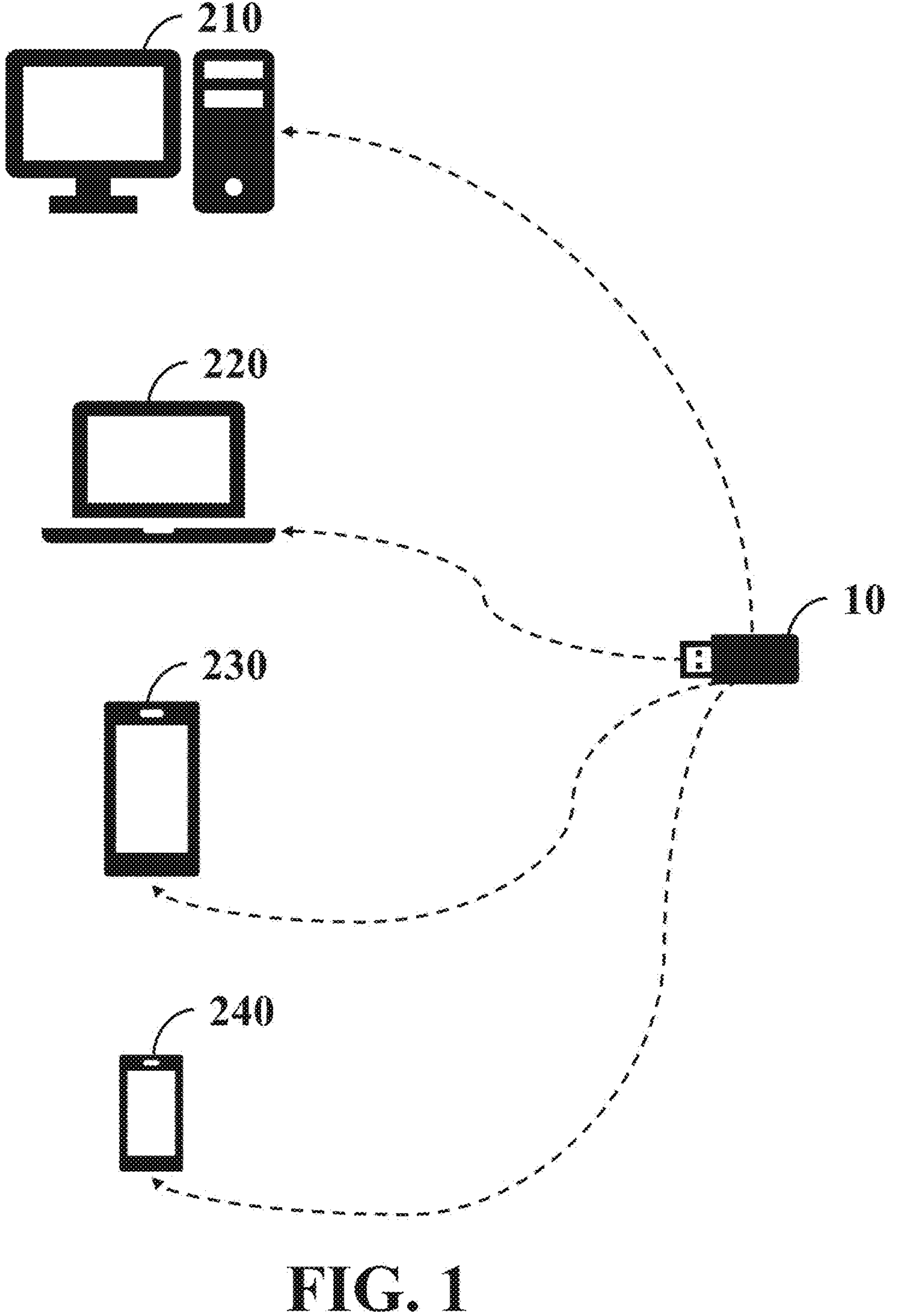
FIG. 1 is a schematic diagram illustrating a portable storage device connecting to host equipment via wires according to an embodiment of the invention.

Refer to FIG. 1. The portable storage device 10 can be a solid state disk (SSD), a NAND memory stick, a NAND flash drive, etc. The portable storage device 10 can be connected to a hos equipment via wires, such as the Personal Computer (PC) 210, the laptop PC 220, the tablet PC 230, the mobile phone 240, a digital camera, a digital recorder, a smart television, a smart freezer, an automotive electronics system or other consumer electronic products, so that the host equipment reads data stored in the portable storage device 10, and/or writes data into the portable storage device. For example, an user can insert the portable storage device 10 into a Universal Serial Bus (USB) port provided by the host equipment to connect to the host equipment in a wired manner.

Figure 2:
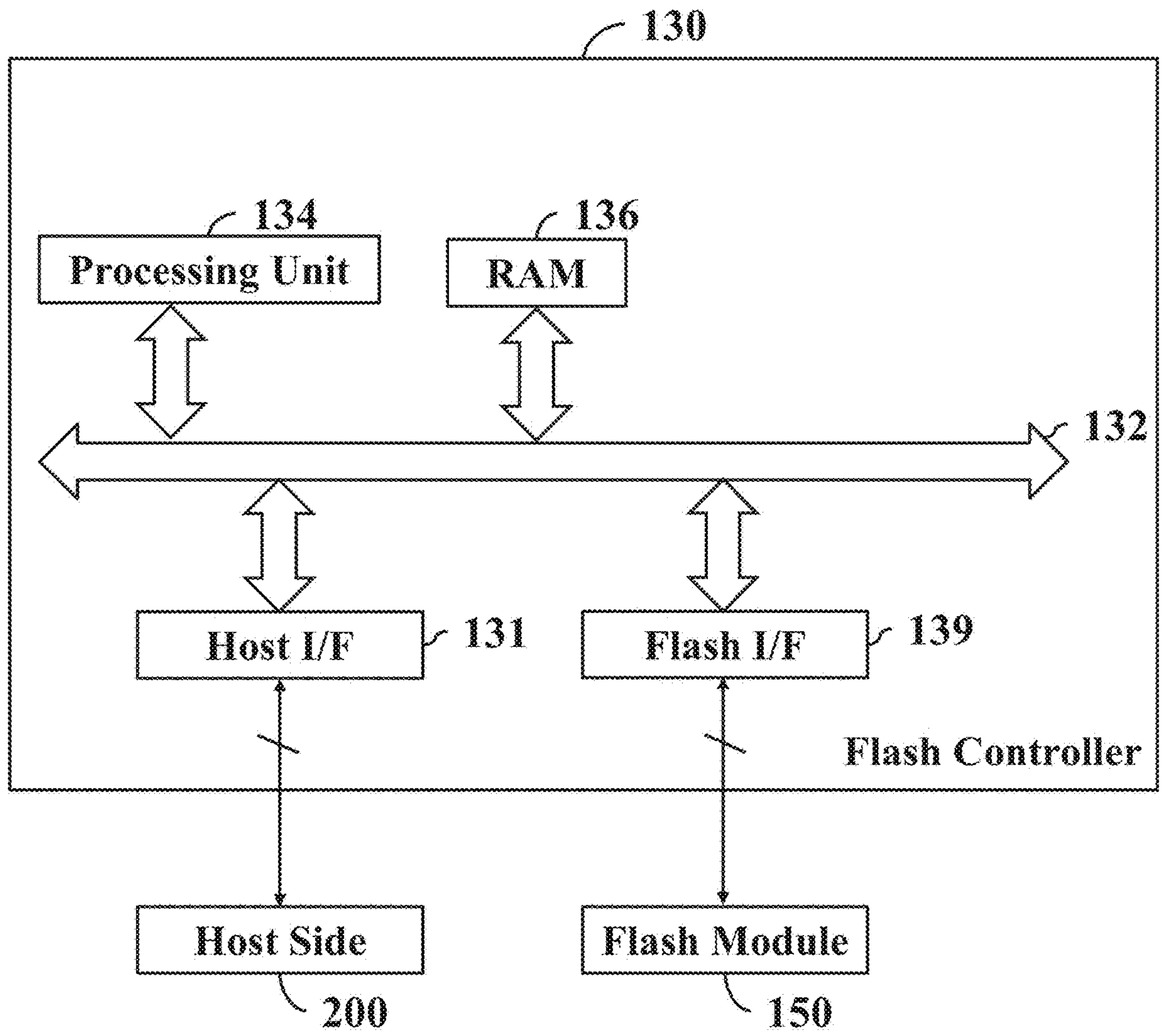
FIG. 2 is the system architecture of an electronic apparatus according to an embodiment of the invention.

Refer to FIG. 2. The host side 200 can be implemented in the host equipment. The portable storage device 10 includes the flash controller 130 and the flash module 150, also referred to as a device side collectively. The host side 200 and the host interface (I/F) 131 of the flash controller 130 may communicate with each other by USB protocol, such as USB2.0, USB3.2 Gen1, USB3.2 Gen2x1, USB3.2 Gen2x2, USB4.0, etc. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 receives host commands from the host side 200 through the host I/F 131, such as write commands, read commands, discard commands, erase commands, etc., schedules and executes the host commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 200 and is to be programmed into the flash module 150, and that has been read from the flash module 150 and is to be output to the host side 200. The RAM 136 stores necessary data in execution, such as variables, data tables, data abstracts, host-address to flash-address mapping (H2F) tables, flash-address to host-address mapping (F2H) tables, or others. The flash i/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136 and the flash I/F 139. A direct memory access (DMA) circuitry of a component moves data between specific components through the bus architecture 132 according to instructions or control signals. For example, a DMA circuitry of the host I/F 131 or the flash I/F 139 may migrate data in a specific data buffer thereof to a specific address of the RAM 136, migrate data in a specific address of the RAM 136 to a specific data buffer thereof, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), strobe, etc.

Figure 3:
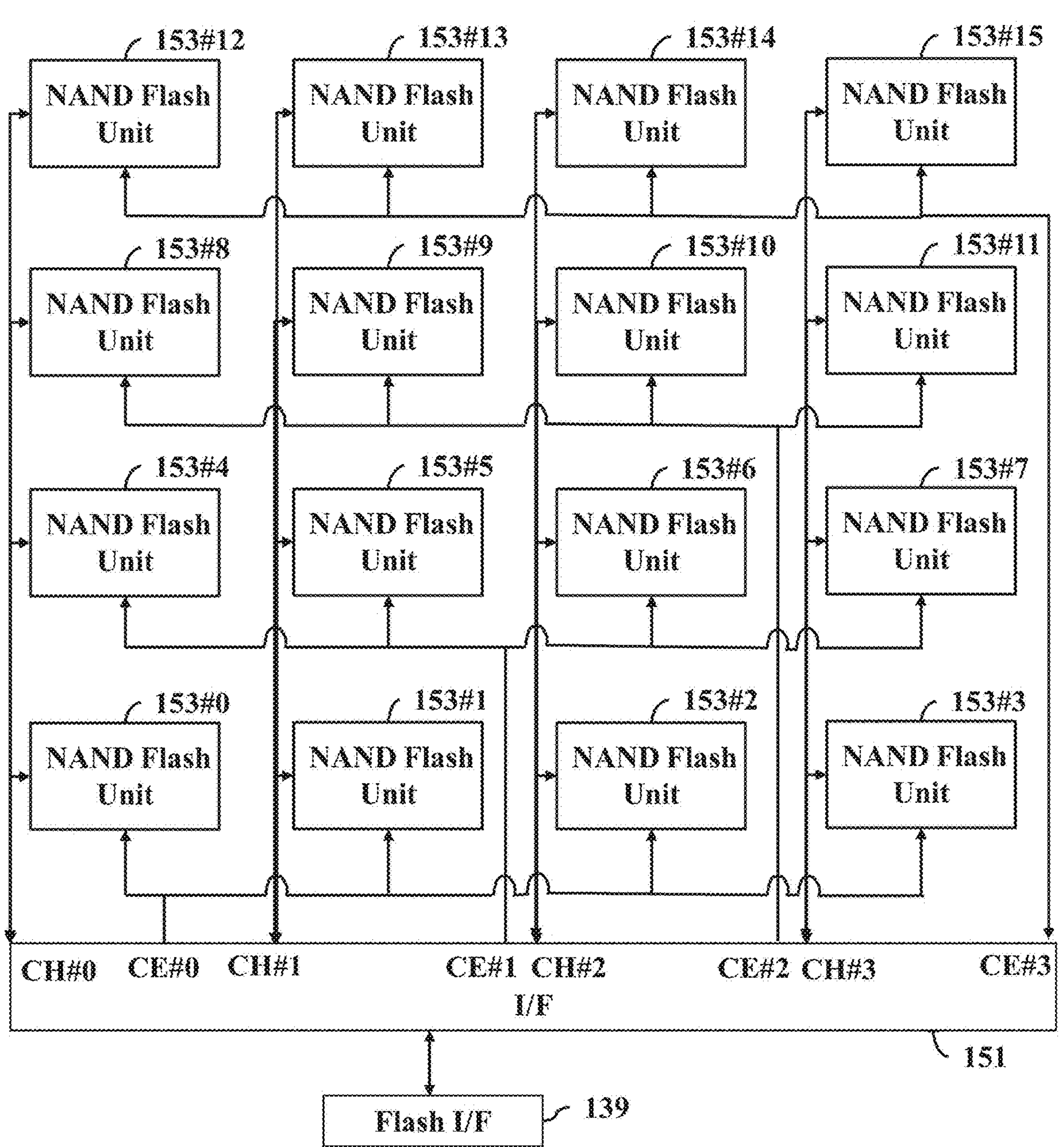
FIG. 3 is a schematic diagram illustrating a flash module according to an embodiment of the invention.

Refer to FIG. 3. The I/F 151 of the flash module 150 may include four I/O channels (hereinafter referred to as channels) CH #0 to CH #3 and each is connected to four NAND flash units, for example, the channel CH #0 is connected to the NAND flash units 153 #0, 153 #4, 153 #8 and 153 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 4:
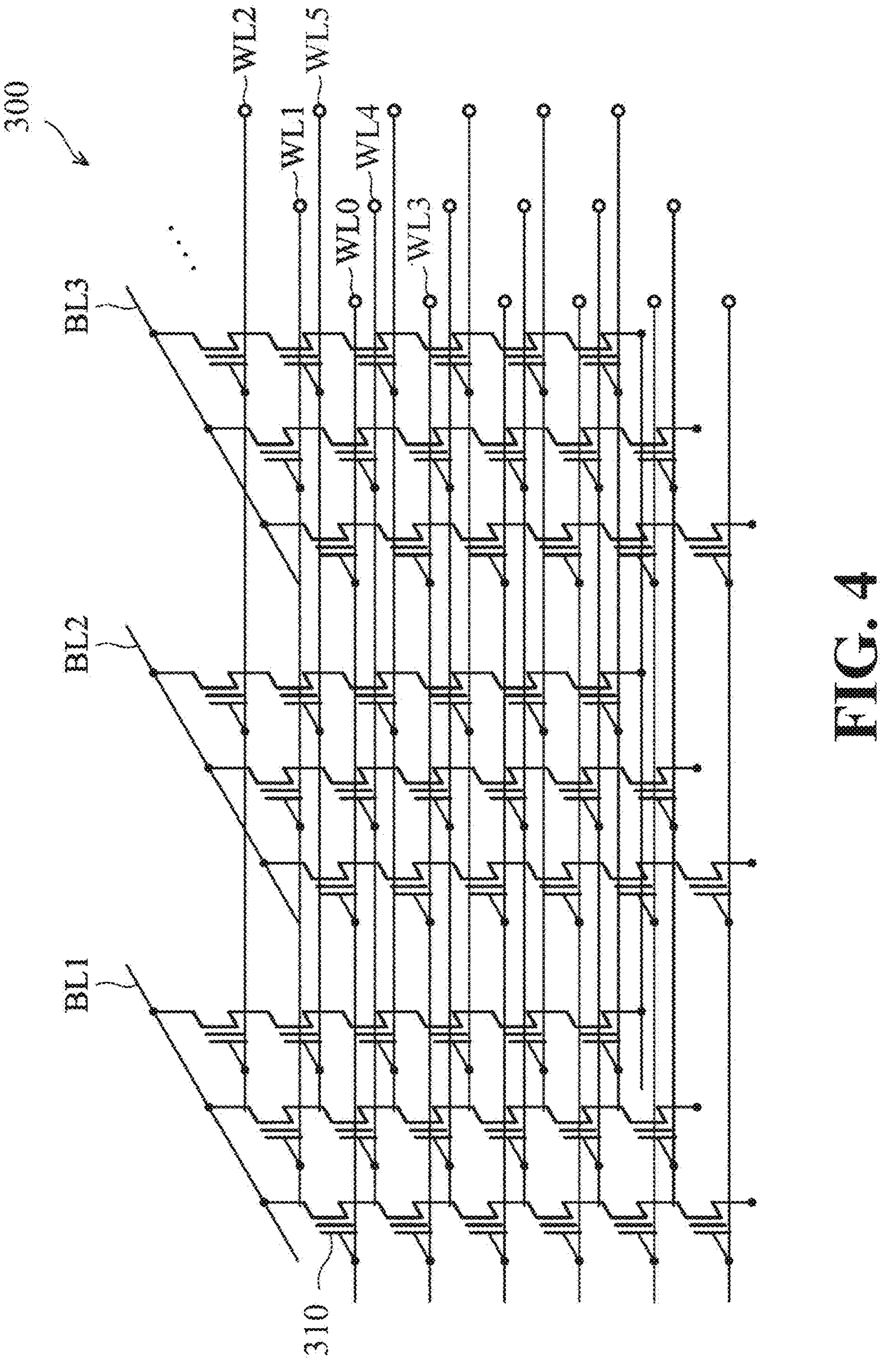
FIG. 4 is a schematic diagram showing the hardware architecture of a portion of a NAND flash unit according to an embodiment of the invention.

Refer to FIG. 4 showing the hardware architecture of a portion of a NAND flash unit. Each NAND flash unit may contain a plurality of memory blocks (e.g. the memory block 300) and the memory block 300 contains multiple memory cells, such as floating gate transistors (e.g. the floating gate transistor 310), or other charge trap devices. The structure of the memory block 300 includes bit lines and word lines. For brevity, only the bit lines BL1 to BL3 and the word lines WL0 to WL5 are labeled in FIG. 3. For example, the floating gate transistors on each of the word lines WL0 to WL2 and WL3 to WL5 store data on one or more pages.

Each NAND flash unit may include multiple data planes, each data plane may include multiple physical blocks. In order to improve the data programming and data reading efficiency, designated physical pages of multiple data planes across multiple NAND flash units are organized into one super page (SP). For example, in the exemplary configuration as shown in FIG. 3, each NAND flash unit includes four data planes, and each data plane includes at least one physical page of four kilobytes (KB). One SP stores user data of 256 KB (=4 channels×4 CE×4 data planes×4 KB). One super block (SB) is composed of multiple SPs. In some embodiments, any SB may be configured as a Single Level Cell (SLB) SB and each SP in the SLC SB is called SLC SP. In alternative embodiments, any SB may be configured as a Multi-Level Cell (MLC) SB and each SP in the MLC SB may be a most significant bit (MSB) SP or a least significant bit (LSB) SP. In still alternative embodiments, any SB may be configured as a Triple Level Cell (TLC) SB and each SP in the TLC SB may be an MSB SP, a center significant bit (CSB) SP or an LSB SP. In still alternative embodiments, any SB may be configured as a Quad-Level Cell (QLC) SB and each SP in the QLC SB may be a top significant bit (TSB) SP, an MSB SP, a CSB SP or an LSB SP.

In some embodiments, one logical block address (LBA) managed by the host side 200 may represent user data of 512 bytes (B), and each physical page may be divided into eight sections in 512B. An LBA number is referred to as a logical address managed by the host side 200. An SB, a physical page and a section may be identified by a super-block number, a physical page number and a section number, respectively, and the combination of the numbers is referred to as a physical address of the flash module 150. In alternative embodiments, one host page number managed by the host side 200 may represent user data of 4 KB and each physical page is not necessary to divide into sections. A host page number is referred to as a logical address managed by the host side 200. An SB and a physical page may be identified by a super-block number and a physical page number, respectively, and the combination of the numbers is referred to as a physical address of the flash module 150.

Each SB is labeled as a data block or a current block according to its function. The processing unit 134 may select an empty SB as the current block for preparing to program user data received from the host side 200. The processing unit 134 maintains the F2H table for each current block. Each F2H table contains multiple records. Each record stores information indicating which logical address of user data that is associated with (or mapped by) a specific physical page in the current block. The records in the F2H table are stored in the order of the page numbers of physical pages in the current block. The logical address is expressed by a logical block address (LBA), a host page number or other expression and is managed by the host side 200. The processing unit 134 may drive the flash I/F 139 to program the corresponding F2H table in the RAM 136 into the data region of the designated physical page of one current block after all physical pages of this current block are fully stored in user data, or the remaining physical pages of this current block are filled with dummy values. For example, one current block may be divided into multiple banks, and the records of the F2H table corresponding to one bank of the current block are programmed into the last physical page of this bank. The current block is changed to the data block after all records of the corresponding F2H table have been programmed into the flash module 150, and the user data stored in the data block cannot be modified. Subsequently, the processing unit 134 selects an empty SB as a new current block.

Since different versions of user data of the same logical address may be programmed into different physical pages in the current block successively, some physical pages containing invalid data may appear in the current block. The processing unit 134 calculates a valid page count (VPC) of the current block. In some embodiments, in addition to the corresponding F2H table, the processing unit 134 further drives the flash I/F 139 to program initial VPCs into the metadata region of the designated physical page (e.g. the last physical page) in the current block. In alternative embodiments, the processing unit 134 maintains a VPC table in the RAM 136 for storing the VPCs of all data blocks. Each time a data block is generated, the processing unit 134 updates the content of VPC table to insert information regarding the VPC of the newly generated data block. The processing unit 134 drives the flash I/F 139 to program the up-to-date VPC table into the designated physical address in the flash module 150 after updating the VPC table for a predetermined number of data blocks.

In addition to programming the F2H table into the designated physical page of the current block, the processing unit 134 updates the H2F table according to the content of F2H table, so that the processing unit 134 when executing host read commands searches the H2F table for the physical addresses user data of particular logical addresses are physically stored in later. The H2F table contains multiple records arranged in the order of the logical addresses, and each record stores information indicating which physical address user data of the corresponding logical address is physically stored in.

Figure 5:
FIG. 5 is an exemplary performance curve graph of a portable storage device in the clean mode and the dirty mode.
Figure 5:
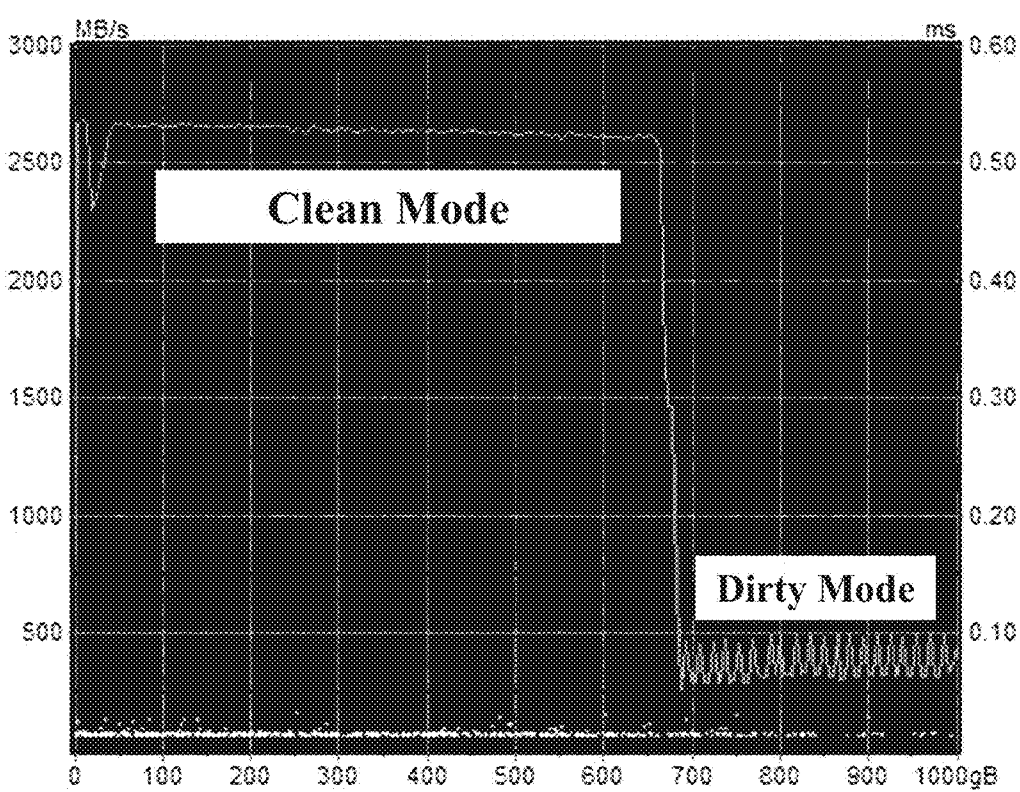

The flash module 150 is in the empty-card state for allowing user to write a large amount of data after the initialization of the portable storage device 10 is completed. In order to make the portable storage device 10 to program user data to the current blocks in the flash module 150 and/or read user data from the data blocks in the flash module 150 at high speed, in some implementations, the flash controller 130 (which is specifically handled by the processing unit 134) in the portable storage device 10 initially puts the portable storage device 10 in the clean mode. In the clean mode, each current block is configured as the SLC SB. Thereafter, the processing unit 134 can read user data from the data blocks configured as the SLC SBs through the flash I/F 139 at the highest speed. It is noted that, in these implementations, the portable storage device 10 would not perform any operation of the garbage collection (GC) process in the clean mode. Empty SBs of the flash module 150 would become few after a time period of access. When the amount of empty SBs of the flash module is lower than a threshold, for example, a preset proportion of the maximum capacity (e.g. 10%, 15% of the total number of SBs, or others) in the flash module 150, or a preset number of SBs (e.g. 10, 15, 20 SBs, or others), the flash controller 130 (which is specifically handled by the processing unit 134) in the portable storage device 10 puts the portable storage device 10 in the dirty mode. In the dirty mode, the processing unit 134 inserts the operations of the GC process during the execution of the host commands. The GC process collects user data of the valid pages in several source blocks (for example, data blocks configured as SLC SBs), and after collecting the valid user data that can fill one non-SLC SB (for example, the MLC SB, the TLC SB or the QLC SB), programs the valid user data into the destination block (for example, the current block configured as the non-SLC SB). However, once entering the dirty mode, the access performance of the portable storage device 10 would be greatly reduced, and it would be easily observed by a user. Referring to the exemplary performance curve graph 50 for the portable storage device as shown in FIG. 5, the measured bandwidth of the portable storage device 10 for accessing user data in the clean mode is approximately 2500 MB/s. Once entering the dirty mode, the measured bandwidth of the portable storage device 10 for accessing user data in the dirty mode would be dramatically decreased to 500 MB/s or lower.

Figure 6:
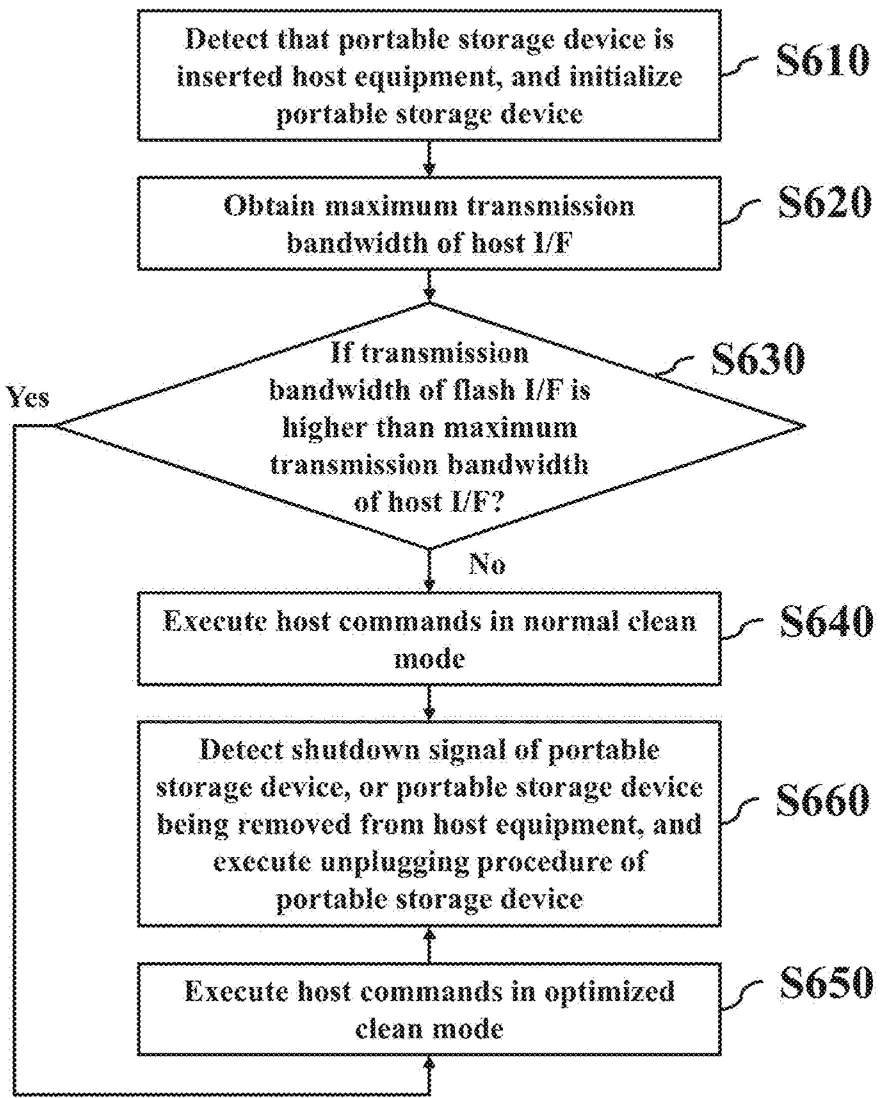
FIG. 6 is a flowchart illustrating a method for handling a GC process in the clean mode according to an embodiment of the invention.

To defer entering the dirty mode, an embodiment of the invention introduces a method for handling GC process in the clean mode, enabling the portable storage device 10 to continuously recycle storage space storing invalid user data to produce new empty SBs. Although the portable storage device 10 operates in the clean mode, the flash controller 130 (specifically, the processing unit 134) still inserts the operations of the GC process to continuously generate new empty SBs during executions of host commands when (or in response to) detecting that the portable storage device 10 is inserted into a low-speed host equipment, so that the portable storage device 10 would delay the time point of entering the dirty mode. The method is performed by the processing unit 134 when loading and executing program code of the system booter and the firmware translation layer (FTL). Refer to FIG. 6 illustrating the flowchart. Details are provided as follows:

Step S610: It is detected that the portable storage device 10 is inserted into a host equipment and the system booter is executed to initialize the portable storage device 10. The initialization procedure of the portable storage device 10 includes a series of hardware tests, the reading of the program code of the FTL, and necessary system information, etc. from the designated physical address of the flash module 150, and the storing of the read ones in the designated address of the RAM 136, which are to be loaded and executed by the processing unit 134 later. The program code of the FTL includes the operations of steps S630, S640 and S650.

Step S620: The maximum transmission bandwidth of the host I/F 131 is obtained. The maximum transmission bandwidth of the host I/F 131 can be obtained in the link test of the initialization procedure. In the polling state, the processing unit 134 performs a series of polling signal interactions with the host equipment (e.g. the host side 100 specifically) through the host I/F 131 to determine the maximum transmission bandwidth supported between the portable storage device 10 and the host side 200. In the polling state, for the port capability negotiation, the Polling.LFPS handshake is performed between the host I/F 131 and the host side 200 to determine the maximum transmission bandwidth of the host I/F 131. For example, in USB2.0, the maximum transmission bandwidth of the host I/F 131 is 40 MB/s. In USB3.2 Gen1, the maximum transmission bandwidth of the host I/F 131 is 300 MB/s. In USB3.2 Gen2x1, the maximum transmission bandwidth of the host I/F 131 is 1000 MB/s. In USB3.2 Gen2x2, the maximum transmission bandwidth of the host I/F 131 is 2000 MB/s. In USB4.0, the maximum transmission bandwidth of the host I/F 131 is 4000 MB/s. The processing unit 134 stores the maximum transmission bandwidth of the host I/F 131, which is obtained in the link test, in the designated address of the RAM 136 for reading in subsequent operations.

Step S630: It is determined whether the transmission bandwidth of the flash I/F 139 is higher than the maximum transmission bandwidth of the host I/F 131. If so, the process proceeds to step S650. Otherwise, the process proceeds to step S640. In some embodiments, the processing unit 134 determines whether the transmission bandwidth of the flash I/F 139 is higher than N times the maximum transmission bandwidth of the host I/F 131, where N may be set to be equal to or greater than 2. The transmission bandwidth of the flash I/F 139 represents the data access capability of the portable storage device 10, which usually corresponds to the hardware configurations of the flash module 150, such as the channel number, the interleave number and the clock frequency of the flash module 150, etc. For example, the transmission bandwidth of the flash I/F 139 is 800 MB/s to reflect the specific hardware configurations of the flash module 150 including 4 channels and 8 interleaves, and the clock frequency of the flash I/F 139 being set to 400 MHz. The transmission bandwidth of the flash I/F 139 is stored in the designated physical address of the flash module 150 as one of the important parameters of the system information in the mass production procedure of the portable storage device 10, so that, in step S630, the processing unit 134 can read the transmission bandwidth of the flash I/F 139 from the designated physical address of the flash module 150 and store the transmission bandwidth of the flash I/F 139 in the designated address of the RAM 136. If the transmission bandwidth of the flash I/F 139 is higher than N times the maximum transmission bandwidth of the host I/F 131, it means that the data access capability of the portable storage device 10 is much higher than the performance requirement of the host equipment. Therefore, a part of the computation resources can be allocated to perform the GC process. For example, assume that the transmission bandwidth of the flash I/F 139 is 800 MB/s, and the maximum transmission bandwidth of the host I/F 131 is 40 MB/s for USB2.0 or 300 MB/s for USB3.2 Gen1: The judgement in step S630 is positive.

Step S640: The host commands (including host read commands, host write commands, host discard commands, host erase commands, etc.) is executed in the normal clean mode. Since the data access capability of the portable storage device 10 just meets or is lower than the performance requirement of the host equipment, the processing unit 134 in the normal clean mode focuses on executing host commands without performing the GC process.

Step S650: The host commands (including host read commands, host write commands, host discard commands, host erase commands, etc.) is executed in the optimized clean mode. Since the data access capability of the portable storage device 10 is higher than the performance requirement of the host equipment, the processing unit 134 in the optimized clean mode inserts the operations of the GC process during the executions of the host commands. The technical details of step S650 are referred to the following paragraphs with FIG. 7.

Steps S640 and S650 may be operated in the working state, such as U0 state in the USB specification, which means that the host equipment is accessing or will access the portable storage device 10 for writing user data of a logical address or a logical address range into the flash module 150, and/or reading user data of a logical address or a logical address range from the flash module 150.

In some embodiments, the host equipment issues a command to the portable storage device 10 to instruct the portable storage device 10 to leave the working state and enter the power saving state, such as U1 state in the USB specification, when the host equipment is no longer to access the portable storage device 10. In alternative embodiments, the host equipment issues a command to the portable storage device 10 to instruct the portable storage device 10 to leave the working state or the power saving state, and enter the idle state, such as U2 state in the USB specification, when the remaining battery power of the host equipment is at a very low level. In alternative embodiments, each time after receiving a host command from the host side 200 through the host I/F 131, the process unit 134 resets the working expiration timer for counting a specified period of time, such as 5, 6 or 7 seconds. The processing unit 134 anticipates that the host equipment may not access the portable storage device 10 temporarily, and makes the portable storage device 10 to leave the working state and enter the power saving state after detecting that the working expiration timer reaches the specified time period. It is noted that the method for handling the GC process as described in the embodiment of the invention is performed in the working state rather than in the power saving state or the idle state. In regular situations, the host side 200 does not send any host command to the portable storage device 10 during the portable storage device 10 enters the power saving state or the idle state. In other words, no host command is required to be executed by the processing unit 134 in the power saving state or the idle state.

Step S660: A shutdown signal of the portable storage device 10, or the portable storage device 10 being removed from the host equipment is detected, and an unplugging procedure of the portable storage device 10 is executed.

Figure 7:
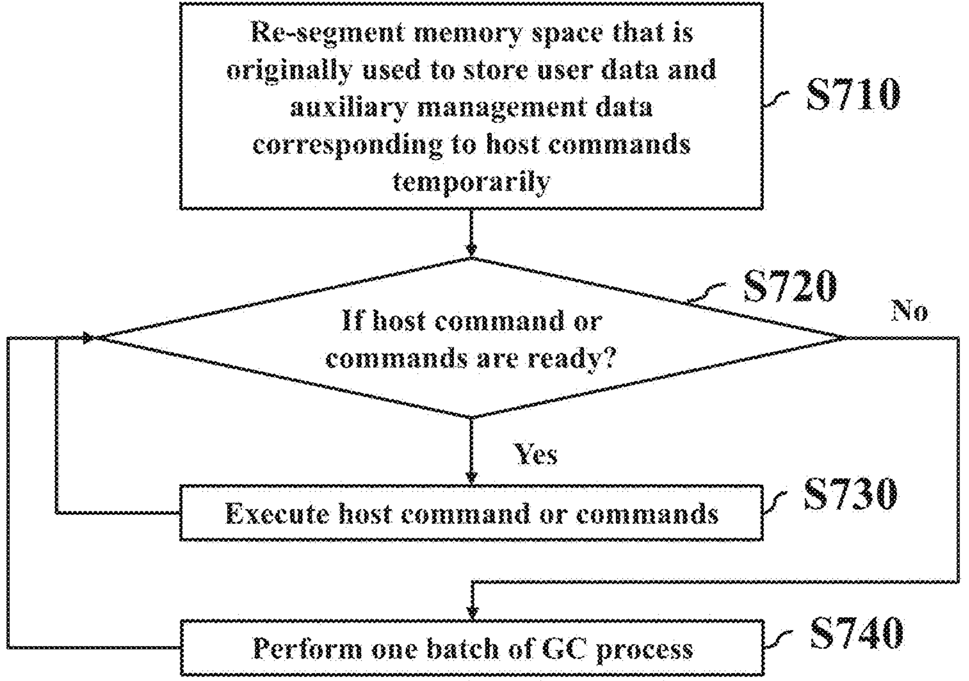
FIG. 7 is a flowchart illustrating a method for executing host commands in the optimized clean mode according to an embodiment of the invention.

For step S650, refer to FIG. 7 illustrating a flowchart of a method for executing host commands in the optimized clean mode. The whole GC process is divided into multiple batches. The method periodically inspects whether one or more host commands are ready. A batch of GC process is performed once the host command or commands are not ready.

Step S710: The space of the RAM 136 that is originally used for storing user data and auxiliary management data corresponding to the host commands is re-segmented.

In some embodiments, after the re-segmentation, one region is used to store the host data and its auxiliary management data temporarily, for example, user data that is received from the host side 200 through the host I/F 131 and is to be programmed into the flash module 150, and/or the user data that is read from the flash module 150 through the flash I/F 139 and is to be replied to the host side 200. Another region is used to store the host data and its auxiliary management data temporarily for the GC process, for example, valid user data that is read from source blocks of the flash module 150 through the flash I/F 139 and is to be programmed into destination blocks of the flash module 150. For example, when the space of the RAM 136 that is originally used to store the host data is 1 MB, a first region is 256 KB for storing user data and auxiliary management data corresponding to the host commands temporarily and a second region is 768 KB for storing valid user data and auxiliary management data corresponding to the GC process.

Step S720: It is determined whether the host command or commands are ready. If so, the process proceeds to step S730. Otherwise, the process proceeds to step S740. The host command ready means that the host command or commands and related parameters (if required, with user data) have been received through the host I/F 131 and temporarily stored in the designated region of the RAM 136.

Step S730: The host command or commands are executed. The processing unit 134 searches for physical addresses in the H2F table, which are mapped by the logical addresses carried in host read commands, reads user data of the logical addresses from the searched physical addresses of the flash module 150 through the flash I/F 139, and replies to the host side 200 with the read user data through the host I/F 131 during the execution of the host read commands. The processing unit 134 programs user data of designated logical addresses into designated physical addresses of the flash module 150 through the flash I/F 139, and updates corresponding mapping information in the F2H table and the H2F table to reflect actual data write results during the execution of host write commands. The processing unit 134 deletes corresponding mapping information in the F2H table and the H2F table to reflect discards or erases of user data during the execution of host discard or erase commands.

Step S740: On batch of the GC process is performed. For example, the whole GC process collects 30000 pages of valid user data from source blocks (e.g. SLC SBs), and programs the collected valid user data into the designated destination block (e.g. non-SLC SB) of the flash module 150 sequentially. The whole GC process may be divided into ten batches, and 3000 pages of valid user data are collected from the flash module 150 and programmed into the flash module 150 in each batch. In the first batch, the processing unit 134 selects the data blocks starting from the data block with the smallest VPC as the source blocks according to the VPC information as described above until the summation of VPCs is greater than or equal to 30000, and next, performs the actual collection and programming for valid user data. In each batch, the processing unit 134 not only drives the flash I/F 139 to read 3000 pages of valid user data from physical addresses of the designated source blocks, and program the valid user data into physical addresses of the designated destination block, but also updates corresponding mapping information in the F2H tables corresponding to the source blocks and the destination block, and corresponding mapping information in the H2F table according to the actual reading and writing results (also referred to as actual migration results) for the GC process.

Since the portable storage device 10 executes host commands in the optimized clean mode as described above during the portable storage device 10 is plugged into a low-speed host equipment, the valid user data is stored more compactly in the storage space of the flash module 150, and the time point at which the portable storage device 10 enters the dirty mode is delayed as much as possible.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

The present invention will be described with respect to particular embodiments and with reference to certain drawings, but the invention is not limited thereto and is only limited by the claims. It will be further understood that the terms “comprises,” “comprising,” “includes” and/or “including,” when used herein, specify the presence of stated features, integers, steps, operations, elements, and/or components, but do not preclude the presence or addition of one or more other features, integers, steps, operations, elements, components, and/or groups thereof.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (e.g., “between” versus “directly between,” “adjacent” versus “directly adjacent.” etc.)

The term “device” or “module” is not limited to one or a specific number of physical objects (such as one smartphone, one controller, one processing system and so on). As used herein, a device may be any electronic device with one or more parts that may implement at least some portions of the invention in this disclosure. While the description and examples use the term "device" or "module" to describe various aspects of this disclosure, the term "device" or "module" is not limited to a specific configuration, type, or number of objects. Additionally, the term "system" or "module" is not limited to multiple components or specific aspects. For example, a system may be implemented on one or more printed circuit boards or other substrates and may have movable or static components. While the description and examples use the term "system" to describe various aspects of the invention in this disclosure, the term "system" is not limited to a specific configuration, type, or number of objects.

Specific details are provided in the description above to provide a thorough understanding of the aspects and examples provided herein. However, it will be understood by one of ordinary skills in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Although the embodiment has been described as having specific elements in FIGS. 2-4, it should be noted that additional elements may be included to achieve better performance without departing from the spirit of the invention. Each element of FIGS. 2-4 is composed of various circuitries and arranged to operably perform the aforementioned operations. While the process flows described in FIGS. 6-7 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for handling a garbage collection (GC) process, performed by a processing unit of a flash controller, wherein a portable storage device is equipped with the flash controller and a flash module, the method comprising:

detecting that the portable storage device is inserted into a host equipment;

obtaining a maximum transmission bandwidth of a host interface (I/F), wherein the flash controller comprises the host I/F, and the host I/F is coupled to the host equipment;

determining that a transmission bandwidth of a flash I/F is higher than the maximum transmission bandwidth of the host I/F, wherein the flash controller comprises the flash I/F, and the flash I/F is coupled to the flash module; and in response to a determination that the transmission bandwidth of the flash I/F is higher than the maximum transmission bandwidth of the host I/F, inserting operations of the GC process during an execution of a host command, wherein the GC process collects valid user data from a plurality of source blocks in the flash module through the flash I/F, and programs the valid user data into a destination block in the flash module through the flash I/F.

2. The method of claim 1, wherein the transmission bandwidth of the flash I/F is higher than N times the maximum transmission bandwidth of the host I/F, N is equal to or greater than 2.

3. The method of claim 1, wherein the maximum transmission bandwidth of the host I/F is obtained in a link test of an initialization procedure.

4. The method of claim 3, comprising:

performing a series of polling signal interactions with the host equipment through the host I/F in a polling state to determine the maximum transmission bandwidth of the host I/F.

5. The method of claim 3, comprising:

reading the transmission bandwidth of the flash I/F from a designated physical address of the flash module through the flash I/F.

6. The method of claim 1, comprising:

re-segmenting space of a random access memory (RAM) that originally stores first user data and first auxiliary management data corresponding to the host command, wherein the space of the RAM is divided into a first region and a second region, the first region is used to store the first user data and the first auxiliary management data corresponding to the host command, and the second region is used to store second user data and second auxiliary management data corresponding to the GC process.

7. The method of claim 1, comprising:

periodically determining whether the host command is ready;

executing the host command when the host command is ready; and performing one batch of the GC process when the host command is not ready.

8. A non-transitory computer-readable storage medium having stored therein program code that, when loaded and executed by a processing unit of a flash controller, causes the processing unit to:

detect that a portable storage device is inserted into a host equipment, wherein the portable storage device is equipped with the flash controller and a flash module;

obtain a maximum transmission bandwidth of a host interface (I/F), wherein the flash controller comprises the host I/F, and the host I/F is coupled to the host equipment;

determine that a transmission bandwidth of a flash I/F is higher than the maximum transmission bandwidth of the host I/F, wherein the flash controller comprises the flash I/F, and the flash I/F is coupled to the flash module; and in response to a determination that the transmission bandwidth of the flash I/F is higher than the maximum transmission bandwidth of the host I/F, insert operations of a garbage collection (GC) process during an execution of a host command, wherein the GC process collects valid user data from a plurality of source blocks in the flash module through the flash I/F, and programs the valid user data into a destination block in the flash module through the flash I/F.

9. The non-transitory computer-readable storage medium of claim 8, wherein the transmission bandwidth of the flash I/F is higher than N times the maximum transmission bandwidth of the host I/F, N is equal to or greater than 2.

10. The non-transitory computer-readable storage medium of claim 8, wherein the maximum transmission bandwidth of the host I/F is obtained in a link test of an initialization procedure.

11. The non-transitory computer-readable storage medium of claim 10, wherein the program code that, when loaded and executed by the processing unit of the flash controller, causes the processing unit to:

perform a series of polling signal interactions with the host equipment through the host I/F in a polling state to determine the maximum transmission bandwidth of the host I/F.

12. The non-transitory computer-readable storage medium of claim 10, wherein the program code that, when loaded and executed by the processing unit of the flash controller, causes the processing unit to:

read the transmission bandwidth of the flash I/F from a designated physical address of the flash module through the flash I/F.

13. The non-transitory computer-readable storage medium of claim 8, wherein the program code that, when loaded and executed by the processing unit of the flash controller, causes the processing unit to:

re-segment space of a random access memory (RAM) that originally stores first user data and first auxiliary management data corresponding to the host command, wherein the space of the RAM is divided into a first region and a second region, the first region is used to store the first user data and the first auxiliary management data corresponding to the host command, and the second region is used to store second user data and second auxiliary management data corresponding to the GC process.

14. An apparatus for handling a garbage collection (GC) process, comprising:

a host interface (I/F);

a flash I/F, coupled to a flash module; and a processing unit, coupled to the host I/F and the flash I/F, arranged operably to: detect that the apparatus is inserted into a host equipment through the host I/F; obtain a maximum transmission bandwidth of the host interface; determine that a transmission bandwidth of the flash I/F is higher than the maximum transmission bandwidth of the host I/F; and in response to a determination that the transmission bandwidth of the flash I/F is higher than the maximum transmission bandwidth of the host I/F, insert operations of the GC process during an execution of a host command, wherein the GC process collects valid user data from a plurality of source blocks in the flash module through the flash I/F, and programs the valid user data into a destination block in the flash module through the flash I/F.

15. The apparatus of claim 14, wherein the transmission bandwidth of the flash I/F is higher than N times the maximum transmission bandwidth of the host I/F, N is equal to or greater than 2.

16. The apparatus of claim 14, wherein the maximum transmission bandwidth of the host I/F is obtained in a link test of an initialization procedure.

17. The apparatus of claim 16, wherein the processing unit is arranged operably to: perform a series of polling signal interactions with the host equipment through the host I/F in a polling state to determine the maximum transmission bandwidth of the host I/F.

18. The apparatus of claim 16, wherein the processing unit is arranged operably to: read the transmission bandwidth of the flash I/F from a designated physical address of the flash module through the flash I/F.

19. The apparatus of claim 14, comprising:

a random access memory (RAM), coupled to the processing unit, wherein the processing unit is arranged operably to: re-segment space of a random access memory (RAM) that originally stores first user data and first auxiliary management data corresponding to the host command, wherein the space of the RAM is divided into a first region and a second region, the first region is used to store the first user data and the first auxiliary management data corresponding to the host command, and the second region is used to store second user data and second auxiliary management data corresponding to the GC process.

20. The apparatus of claim 14, wherein the processing unit is arranged operably to: periodically determine whether the host command is ready; execute the host command when the host command is ready; and perform one batch of the GC process when the host command is not ready.

* * * * *